(12) United States Patent
Zhang et al.

(10) Patent No.: US 7,743,525 B2
(45) Date of Patent: Jun. 29, 2010

(54) PLANENESS TESTING APPARATUS

(75) Inventors: Bing-Jun Zhang, Shenzhen (CN); Lian-Zhong Gong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 40 days.

(21) Appl. No.: 12/109,350

(22) Filed: Apr. 25, 2008

(65) Prior Publication Data

US 2009/0106995 A1 Apr. 30, 2009

(30) Foreign Application Priority Data

Oct. 30, 2007 (CN) .................. 2007 1 0202311

(51) Int. Cl.
*G01B 5/25* (2006.01)
*G01B 5/20* (2006.01)

(52) U.S. Cl. .......................... 33/533; 33/551

(58) Field of Classification Search .................. 33/533, 33/551–556, 549, 1 BB
See application file for complete search history.

(56) References Cited

U.S. PATENT DOCUMENTS

| | | | | |
|---|---|---|---|---|
| 4,212,106 A * | 7/1980 | Smith | ............................ | 33/520 |
| 5,058,284 A * | 10/1991 | Stevenson | ..................... | 33/535 |
| 5,131,161 A * | 7/1992 | Drag | ............................ | 33/533 |
| 5,339,534 A * | 8/1994 | Krayenhagen | ................ | 33/533 |
| 5,826,345 A * | 10/1998 | Hendricks | ...................... | 33/365 |
| 6,148,532 A * | 11/2000 | Ellis | ............................ | 33/533 |
| 6,195,905 B1 * | 3/2001 | Cole | ............................. | 33/640 |
| 6,792,691 B2 * | 9/2004 | Genal et al. | .................... | 33/833 |
| 7,328,518 B2 * | 2/2008 | Taniuchi et al. | ................ | 33/553 |
| 7,340,843 B2 * | 3/2008 | Zhang et al. | ................... | 33/533 |
| 7,509,751 B2 * | 3/2009 | Lee | ................ | 33/542 |
| 7,624,512 B2 * | 12/2009 | Zhang et al. | ................ | 33/555.1 |
| 2006/0080852 A1* | 4/2006 | Taniuchi et al. | ................ | 33/553 |
| 2007/0220768 A1* | 9/2007 | Zhang et al. | ................... | 33/533 |
| 2008/0047156 A1* | 2/2008 | Lee | ................ | 33/542 |
| 2008/0155846 A1* | 7/2008 | Li et al. | ........................ | 33/533 |
| 2009/0031573 A1* | 2/2009 | Zhang et al. | ................ | 33/555.1 |

FOREIGN PATENT DOCUMENTS

JP 59116501 A 7/1984

* cited by examiner

*Primary Examiner*—Yaritza Guadalupe-McCall
(74) *Attorney, Agent, or Firm*—Frank R. Niranjan

(57) ABSTRACT

An exemplary apparatus for testing planeness of a workpiece is provided. The apparatus includes a platform for supporting the workpiece thereon, a bracket vertically mounted to the platform, and a testing system mounted to the bracket for testing the workpiece. The testing system includes a testing member, a test dial indicator having a sliding pole, and a fine-tuning member for controlling the movement of the testing member. One end of the testing member is connected to the sliding pole. When testing, the fine-tuning member drives the testing member to move toward the workpiece, until the testing member contacts the workpiece. The sliding pole extends together with the testing member. A value is shown by the test dial indicator that indicates the moving distance of the testing member. A distortion value of the workpiece can be obtained according to the value.

9 Claims, 5 Drawing Sheets

PLANENESS TESTING APPARATUS

BACKGROUND

1. Field of the Invention

The present invention relates a device for testing planeness of a workpiece.

2. Description of Related Art

A workpiece, such as a flat plate, is easy to be deformed after a punching process or other machining processes. Thus it is necessary to test the planeness of the workpiece.

Typically, a plug gauge is used for testing the planeness of the workpiece. The workpiece is generally placed on a flat support, thus a plurality of clearances is formed between different parts of the workpiece and the flat support. An attempt is made to insert the plug gauge into each clearance. The planeness of the workpiece is unobtainable if the plug gauge cannot fit into any of the clearances. However, using the plug gauge to test each clearance is time-consuming and inefficient.

What is needed, therefore, is to provide a laborsaving and convenient apparatus for testing planeness of a workpiece.

SUMMARY

An exemplary apparatus for testing planeness of a workpiece includes a platform for supporting the workpiece thereon, a bracket vertically mounted to the platform, and a testing system mounted to the bracket for testing the workpiece. The testing system includes a testing member, a test dial indicator having a sliding pole, and a fine-tuning member for controlling the movement of the testing member. One end of the testing member is connected to the sliding pole. During testing, the fine-tuning member drives the testing member to move toward the workpiece, until the testing member contacts the workpiece, the sliding pole extends together with the testing member. A value is shown by the test dial indicator that indicates the moving distance of the testing member. A distortion value of the workpiece can be obtained according to the value.

Other advantages and novel features will become more apparent from the following detailed description of a preferred embodiment when taken in conjunction with the accompanying drawings, in which:

DETAILED DESCRIPTION

Figure 1:
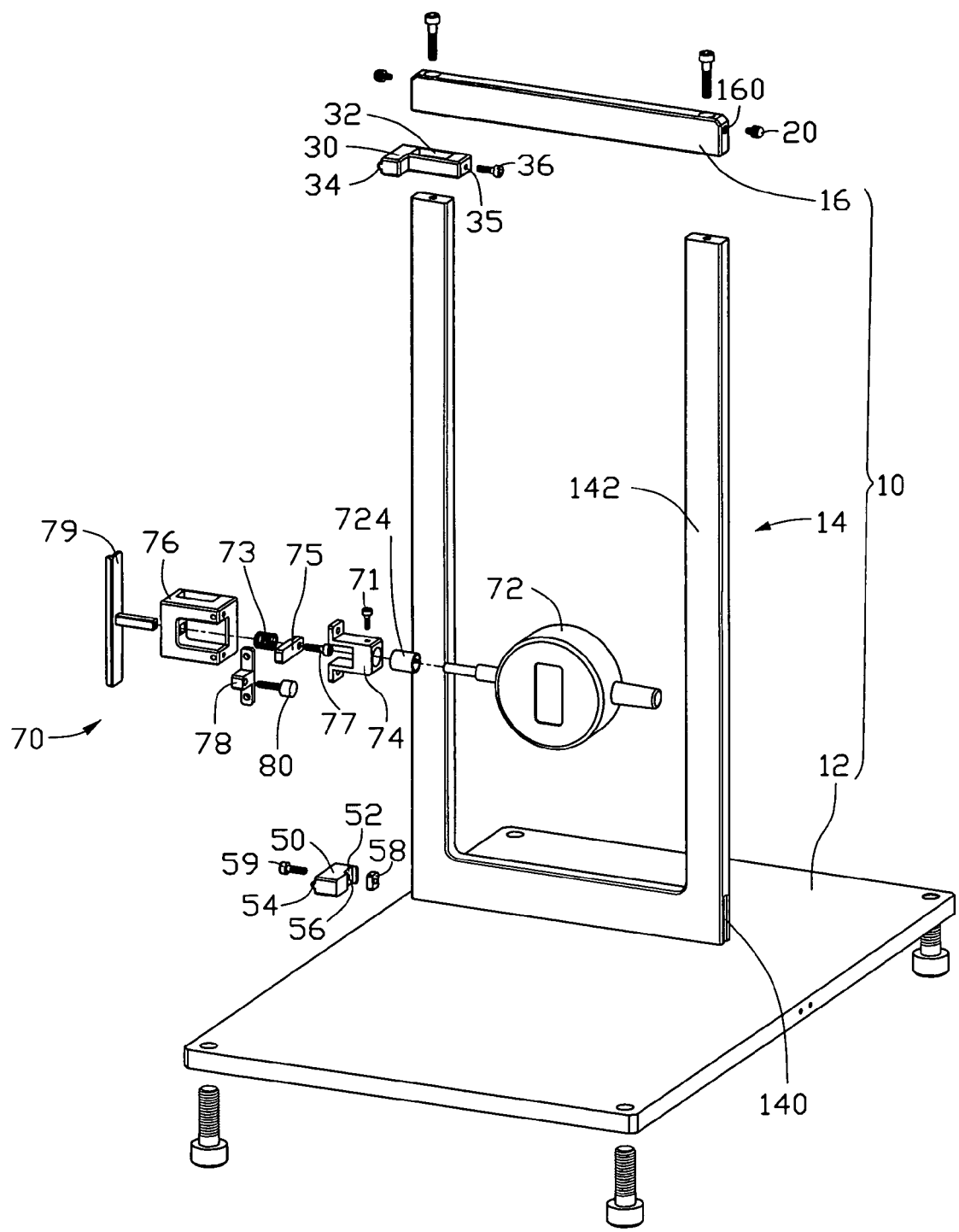
FIG. 1 is an exploded, isometric view of a planeness testing apparatus in accordance with an embodiment of the present invention, the planeness testing apparatus including a testing system.

Referring to FIG. 1, a planeness testing apparatus, in accordance with an embodiment of the present invention, is provided for testing a planeness of a workpiece, such as a flat board. The planeness testing apparatus includes a workbench 10, a first fixing member 30, a second fixing member 50, a testing system 70, and a fine-tuning member, such as a fine-tuning screw 80.

The workbench 10 includes a platform 12, a U-shaped bracket 14 vertically mounted to the platform 12, and a beam 16 mounted to a top of the bracket 14. Four supports (not labeled) are mounted to four corners of the platform 12 respectively, for supporting the platform 12. The bracket 14 includes two parallel arms 142. Each arm 142 defines a rectangular sliding slot 140 in an outer side surface thereof adjacent the platform 12. The beam 16 defines two screw holes 160 in opposite end surfaces thereof, for receiving two testing means 20.

The first fixing member 30 is L-shaped and includes a first section and a second section perpendicularly extending from an end of the first section. The first section defines a through hole 32 from a top to a bottom thereof, and a screw hole 35 communicating with the through hole 32 in an end surface thereof. A rounded first locating portion 34 extends from a side opposite to the first section, of the second section.

The second fixing member 50 is rectangular shaped, and includes two opposite sidewalls. A notch 52 is defined in one of the sidewalls, and a rounded second locating portion 54 extends from the other one of the sidewalls. A screw hole 56 is defined in the second fixing member 50, extending through a bottom of the notch 52 and the sidewall opposite to the notch 52.

Figure 2:
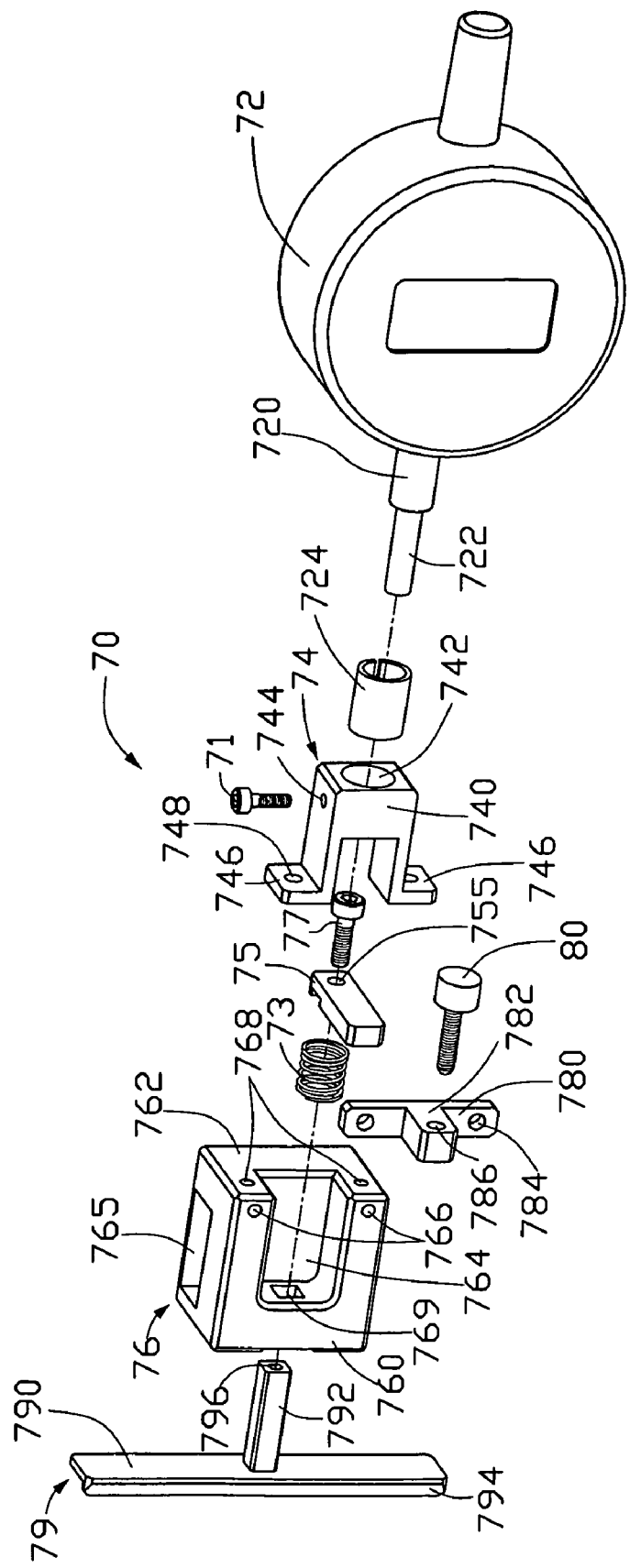
FIG. 2 is an enlarged view of the testing system of FIG. 1.

Referring also to FIG. 2, the testing system 70 includes a test dial indicator 72, a frame 74 adapted for supporting the test dial indicator 72, a supporting tray 76, a fastening member 78 fastened to the supporting tray 76, a stopping block 75, a spring 73, a screw 77, and a testing member 79. The test dial indicator 72 has a connecting portion 720, and a sliding pole 722 extending through the connecting portion 720. The frame 74 has a U-shaped main portion 740. The main portion 740 includes a connection plate, and two side plates extending from opposite sides of the connection plate. Two flanges 746 perpendicularly extend out from distal ends of the side plates, respectively. Two screw holes 748 are defined in the flanges 746 respectively. A horizontal through hole 742 is defined in a middle of the connection plate. A screw hole 744 perpendicular to and communicating with the through hole 742 is defined in the main portion and extending from one side plate to the other side plate. The supporting tray 76 is rectangular shaped and includes a first sidewall 760 parallel to a moving direction of the sliding pole 722, and a second sidewall 762 adjacent the first sidewall 760 and facing the frame 74. An elongated concave 764 is horizontally defined in a junction of the first sidewall 760 and the second sidewall 762, for accommodating the spring 73 and the stopping block 75 therein. A vertical opening 765 is defined in the supporting tray 76 from a top to a bottom, opposing to the first sidewall 760. Two screw holes 766 are defined in the first sidewall 760, adjacent the second sidewall 762 and at opposite sides of the concave 764 respectively. Two screw holes 768 are defined in the second sidewall 762, adjacent the first sidewall 760 and at opposite sides of the concave 764 respectively. A through hole 769 is defined in a middle portion of a sidewall of the supporting tray 76 opposite to the second sidewall 762, and communicates with the concave 764. The fastening member 78 includes a vertical base plate 780 and a projecting portion 782 perpendicularly protruding from a middle of the base plate 780. Two screw holes 784 are defined in the base plate 780 at opposite sides of the projecting portion 782, corresponding to the screw holes 766 of the supporting tray 76, respectively. A horizontal screw hole 786 is defined in the projecting portion 782. The testing member 79 includes a vertical section 790 and a horizontal section 792 perpendicularly extending from a middle of the vertical section 790. A bulge 794 is stamped from a side of the vertical section 790, away from the horizontal section 792. A screw hole 796 is defined in a distal end of the horizontal section 792 along an axial direction. The stopping block 75 defines a screw hole 755 in an end thereof.

Figure 3:
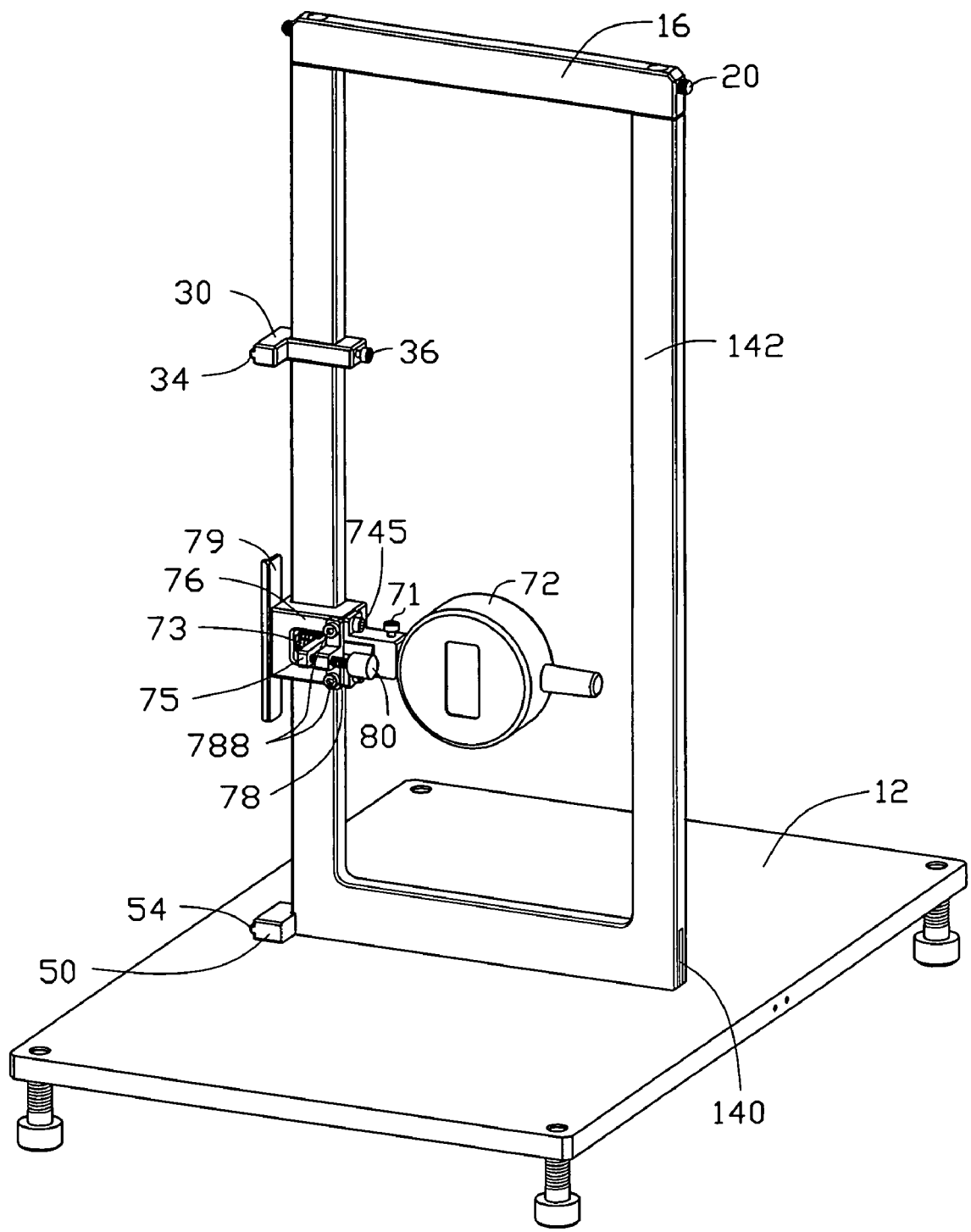
FIG. 3 is an assembled view of FIG. 1.

Referring also to FIG. 3, in assembly, the supporting tray 76 slidably fits about one arm 142 of the workbench 10 via the opening 765. The supporting tray 76 slides along the arm 142 to a certain position, and is fixed to the arm 142 via screws (not shown). The horizontal section 792 of the testing member 79 passes through the through hole 769 of the supporting tray 76 and a through hole of the spring 73. The screw 77 is extended through the screw hole 755 of the stopping block 75 to engage in the screw hole 796 of the horizontal section 792 of the testing member 79, therefore, the stopping block 75 is fixed to the distal end of the horizontal section 792 with a free end of the stopping block 75 protruding out of the first sidewall 760 of the supporting tray 76. The spring 73 and the stopping block 75 are received in the concave 764, with two ends of the spring 73 respectively propping against a sidewall of the concave 764 and the stopping block 75. Two screws 788 are respectively extended through the screw holes 784 of the fastening member 78 to be screwed in the screw holes 766 of the supporting tray 76, to fix the fastening member 78 to the first sidewall 760 of the supporting tray 76, with the projecting portion 782 of the fastening member 78 parallel to the free end of the stopping block 75. The fine-tuning screw 80 is inserted through the horizontal screw hole 786 of the fastening member 78 and propped against a surface of the free end of the stopping block 75. Two screws 745 are respectively inserted through the screw holes 748 of the flanges 746 of the frame 74 and engaged in the screw holes 768 of the supporting tray 76, to fix the frame 74 to the second sidewall 762 of the supporting tray 76. A sleeve 724 with a notch being defined in a circumference along an axial direction thereof fits about the connecting portion 720 of the test dial indicator 72. The sliding pole 72 and the connecting portion 7202 of the test dial indicator 72, and the sleeve 724 are extended through the horizontal through hole 742 of the frame 74, with a free end of the sliding pole 722 resiliently propping against the screw 77, and the sleeve 724 is received in the horizontal through hole 742. A screw 71 is inserted through the screw hole 744 of the frame 74 to be propped against the circumference of the sleeve 724 to retract the sleeve 724, thus the connecting portion 720 can be tightly received in the sleeve 724.

The first fixing member 30 slidably fits about the arm 142 via the through hole 32 thereof. A screw 36 is inserted through the screw hole 35 of the first fixing member 30 to be propped against an inner side surface of the arm 142, for fixing the first fixing member 30 to the arm 142 and above the testing system 70.

A nut 58 is slidably received in the sliding slot 140 of the arm 142, a screw 59 is extended through the screw hole 56 of the second fixing member 50, a screw hole of the nut 58 to be engaged with the arm 142, to fix the second fixing member 50 to the arm 142, with a part of the arm 142 being received in the notch 52 of the second fixing member 50. The beam 16 is mounted to tops of the arms 142 of the bracket 14. An outermost part of the first locating portion 34 of the first fixing member 30 and an outermost part of the second locating portion 54 of the second fixing member 50 together define a vertical plane.

Figure 4:
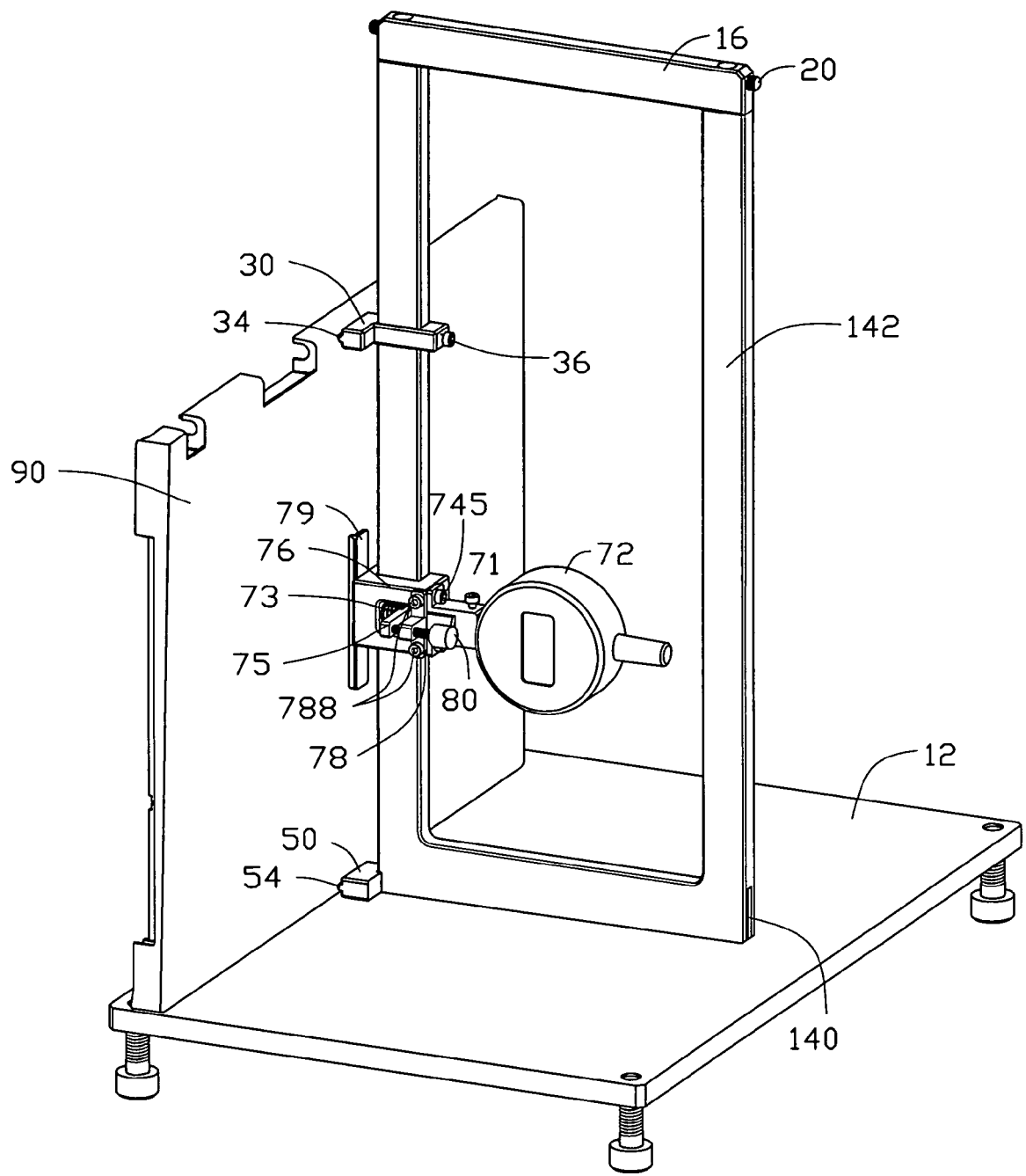
FIG. 4 is similar to FIG. 3, but showing a workpiece being tested for convexity.

Referring also to FIG. 4, in use, when a flat workpiece 90 is to be tested for convexity, the fine-tuning screw 80 is released to be disengaged from the stopping block 75. The spring 73 is restored to drive the stopping block 75, the screw 77, and the testing member 79 to move toward the test dial indicator 72, and the sliding pole 722 of the test dial indicator 72 is pressed to retract until the vertical section 790 touches the supporting tray 76. At this time, a distance, d, between the vertical plane is defined by the outermost parts of the first and second locating portions 34, 54 and the vertical section 790. The test dial indicator 72 is adjusted to zero. The first fixing member 30 and the second fixing member 50 are vertically adjusted according to a size of the workpiece 90, then the workpiece 90 is placed on the platform 10. Two ends of the workpiece 90 are respectively propped against the first locating portion 34 and the second locating portion 54. The testing system 70 is moved relative to the arm 142 to make the bulge 794 of the testing member 79 align with the convex surface of the workpiece 90, then the supporting tray 76 is fastened to the arm 142. The fine-tuning screw 80 is fastened to drive the stopping block 75 to move toward the workpiece 90, the spring 73 is deformed by the stopping block 75 to drive the testing member 79 to slightly move toward the workpiece 90. If no light passed through an interspace between the bulge 794 of the testing member 79 and the convex surface of the workpiece 90, that is to say, the bulge 794 contacts the convex surface of the workpiece 90, a value is shown by the test dial indicator 72. A difference of the distance d and the value shown by the test dial indicator 72 is equal to a distortion value of the workpiece 90.

Figure 5:
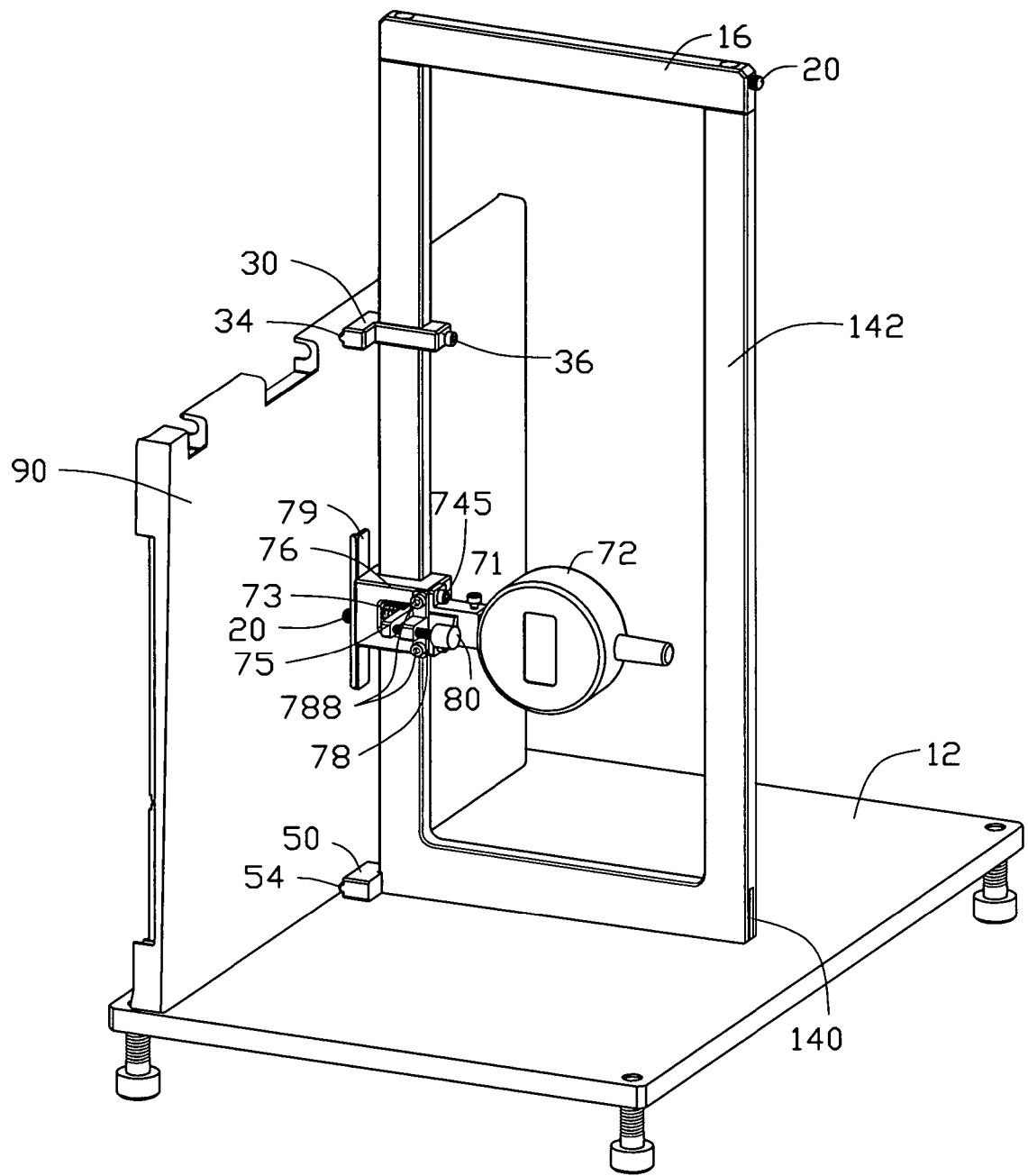
FIG. 5 is similar to FIG. 3, but showing a workpiece being tested for concavity.

Referring also to FIG. 5, if the flat workpiece 90 is to be tested for concavity, one testing means 20 is released from the beam 16 and fixed into a screw hole of the vertical section 790 of the testing member 79, away from the fine-tuning screw 80, the fine-tuning screw 80 is disengaged from the stopping block 75. The spring 73 is restored to drive the stopping block 75, the screw 77, and the testing member 79 to move toward the test dial indicator 72, and the sliding pole 722 of the test dial indicator 72 is pressed to retract until the vertical section 790 touches the supporting tray 76. At this time, an outermost portion of the testing means 20 is at the plane defined by the outermost parts of the first fixing member 30 and the second fixing member 50. The test dial indicator 72 is adjusted to zero. The workpiece 90 is placed on the platform 10. Two ends of the workpiece 90 are respectively propped against the first locating portion 34 and the second locating portion 54. The testing system 70 is moved relative the arm 142, to make the testing means 20 align with the concave surface of the workpiece 90, then the supporting tray 76 is fastened to the arm 142. The fine-tuning screw 80 is fastened to drive the stopping block 75 to move toward the workpiece 90, the spring 73 is deformed by the stopping block 75 to drive the testing member 79 to slightly move toward the workpiece 90. If no light passes through an interspace between the end of the testing means 20 and the concave surface of the workpiece 90, that is to say, the end of the testing means 20 contacts the concave surface of the workpiece 90, a value shown by the test dial indicator 72 is equal to a distortion value of the workpiece 90.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An apparatus for testing planeness of a workpiece, comprising:
   a platform configured for supporting the workpiece thereon;
   a bracket vertically mounted to the platform;
   a testing system mounted to the bracket, comprising:

a test dial indicator having a sliding pole;
a supporting tray mounted to the bracket and comprising:
   a first sidewall parallel to a moving direction of the sliding pole;
   a second sidewall adjacent the first sidewall and facing the test dial indicator;
   a concave defined in a junction of the first sidewall and the second sidewall; and
   a through hole defined in a middle portion of a sidewall of the supporting tray opposing to the second sidewall, and communicates with the concave;
a testing member, with one end thereof being connected to the sliding pole, and comprising a vertical section and a horizontal section perpendicularly extending from the vertical section, wherein the vertical section is configured for contacting the workpiece, and the horizontal section slidably passes through the through hole of the supporting tray and is received in the concave; and
a fine-tuning member for controlling the movement of the testing member;
wherein when testing, the fine-tuning member drives the testing member to move toward the workpiece until the testing member contacts the workpiece, the sliding pole extends together with the testing member, a value shown by the test dial indicator shows a moving distance of the testing member.

2. The apparatus as claimed in claim 1, wherein the bracket comprises an arm perpendicular to the platform;
   a vertical opening opposite to the first sidewall is defined in the supporting tray; and
   the supporting tray fits about the arm of the bracket via the opening.

3. The apparatus as claimed in claim 1, wherein the testing system further comprises a stopping block, a spring, and a fixing member;
   the spring fits about the horizontal section of the testing member;
   the connecting member fixes one end of the stopping block to a distal end of the horizontal section; and
   one end of the spring acts against the supporting tray, and the other end of the spring acts against the stopping block.

4. The apparatus as claimed in claim 3, wherein the testing system further comprises a fastening member;
   the fastening member comprises a vertical base plate and a projecting portion perpendicularly protruding from the base plate;
   the fastening member is fixed to the first sidewall of the supporting tray, and the fine-tuning member is fixed to the projecting portion of the fastening member with a distal end thereof rests against the other end of stopping block.

5. The apparatus as claimed in claim 3, wherein the testing system further comprises a frame;
   the frame comprises a U-shaped main portion;
   the main portion comprises a connection plate, and two side plates extending from opposite sides of the connection plate, two flanges extend out from distal ends of each of the side plates, and are mounted to the second sidewall of the supporting tray; and
   the connection plate defines a through hole therein for the sliding pole of the test dial indicator passing therethrough to rest against the fixing member.

6. The apparatus as claimed in claim 3, wherein a screw hole is perpendicular to and communicates with the horizontal through hole is defined in the main portion of the frame;
   the test dial indicator has a connecting portion, and the sliding pole extends through the connecting portion;
   a sleeve fits about the connecting portion of the test dial indicator;
   the sliding pole, the connecting portion and the sleeve are extended through the through hole of the connection plate;
   a screw is inserted through the screw hole of the frame and propped against a circumference of the sleeve to fix the test dial indicator to the frame.

7. The apparatus as claimed in claim 6, wherein a notch is defined in the circumference of the sleeve along an axial direction.

8. The apparatus as claimed in claim 1, wherein a bulge is located on a side of the vertical section of the testing member, and the bulge is configured for propping against a convex portion of the workpiece.

9. The apparatus as claimed in claim 1, wherein a testing means is mounted to the vertical section of the testing member, away from the horizontal section; and an end of the testing member is configured for engagement with of the workpiece.

* * * * *